Aug. 15, 1961   R. H. THORNER   2,995,898
FLUID OPERATED GOVERNOR
Filed June 3, 1952   3 Sheets-Sheet 3

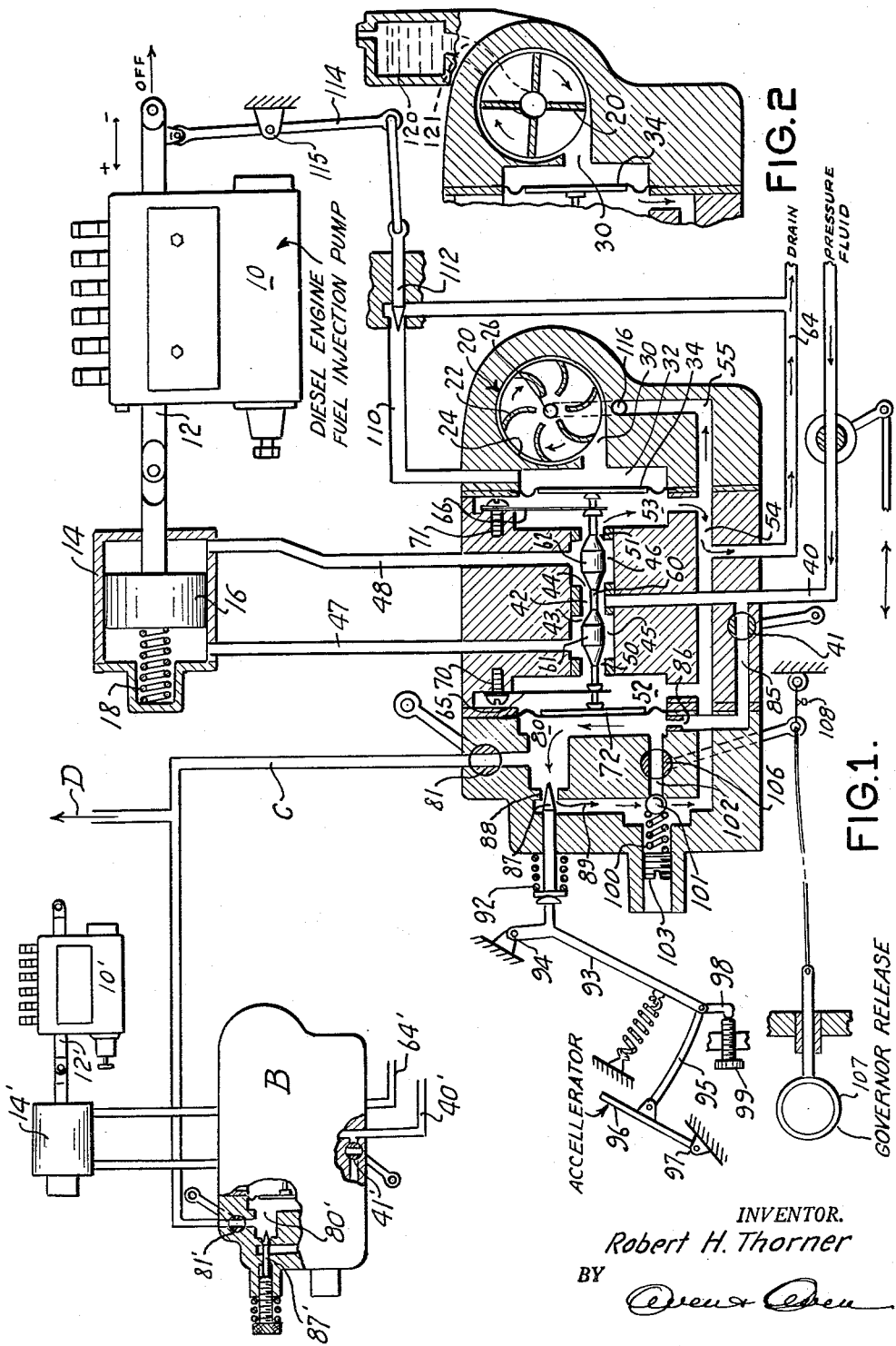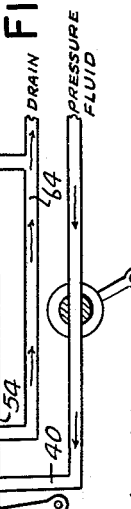

INVENTOR.
Robert H. Thorner
BY
ATTORNEYS

United States Patent Office 2,995,898
Patented Aug. 15, 1961

2,995,898
FLUID OPERATED GOVERNOR
Robert H. Thorner, 3410 W. Chicago Blvd.,
Detroit, Mich.
Filed June 3, 1952, Ser. No. 291,381
20 Claims. (Cl. 60—97)

This invention relates to governors for internal combustion engines and has for its principal object the provision of means to improve substantially the degree of regulation of the governed machine. This application is a continuation-in-part of my copending application Serial No. 77,839, filed Feb. 23, 1949 and now abandoned.

At the present time, engine governors either of the constant speed type or of the full range type are costly and complex, due principally to the efforts of the manufacturers to eliminate friction in the governing mechanism. If the engine manufacturer desires a governor that is capable of very close regulation to a given speed, the governor supplier finds it necessary to mount the rotating parts in very precise anti-friction bearings, to lap and harden those surfaces where relatively rotating parts are in engagement and to adopt various expedients tending to reduce the friction in this product. Despite this, all present governors are limited in the degree of regulation they can provide by the friction in the system.

It is also generally true that governor designs must be worked out with the utmost care if manufacturing variables are not to upset the resulting product to the extent that mass production of consistent units is virtually impossible. Each governor of a particular design must behave like all other governors of the same design, and the usual mechanisms incorporating a multiplicity of springs, frictional elements, shaft supported rotating parts and the like are very difficult to duplicate in practice.

It has long been known that it is a relatively simple matter to provide a force, either hydraulic, mechanical or electrical that varies in a known and constant relationship to almost any desired performance factor of an engine, whether it be speed, load, torque, temperature, or the like. It is also a relatively simple matter to provide some means of moving an engine control element such as a throttle or fuel pump rack with a high degree of precision. For the most part servo-motors of known design can perform this function admirably. The difficulty has been encountered in designing a mechanism that is sensitive to small changes in the force developed by the first element that could initiate movement of the servo-motor with that degree of precision desired to give the required engine characteristic. For example, a fluid member can be rotated by an engine to give a pressure that varies with engine speed over a precise and repetitive speed-force curve. If engine speed is to be the controlling factor, a fluid servo-motor can be made to operate the engine throttle or fuel pump rack, but at the present time all of the devices utilized to sense changes in the fluid pressure, and in response to such forces institute a corrective movement of the servo-motor, are sluggish in their action, are complex and are otherwise unsatisfactory. These devices have a marked tendency to over control, that is, to move beyond the position required for the corrective action and thus to require a reverse correction before the desired corrected position is reached.

In most servo type governors the pilot valve that distributes fluid to the servo-motor is, at least in part, a slidable piston which opens and closes fluid ports to the pressure responsive member to bring about stability. In most servo mechanisms the ports to the pressure responsive member of the servo-motor are either totally open or totally closed and no modulation of the pressure is obtained. A piston valve has the disadvantage that it must slide axially in a cylinder with the inherent frictional contact between the metal of the piston and the metal of the cylinder. While these contacting surfaces may be kept as clean as possible by the use of filters, any dirt, grit or products of corrosion or erosion of the surfaces will increase the friction and cause delays in the movement of the pilot valve, which delays are amplified to produce surging and hunting. Further, in those cases where oil is used, the surface tension of the oil and gum that is inevitably present due to the disintegration of the fluid add to the lag in the operation of the pilot valve.

It is thus apparent that it is desirable to eliminate all lag in the entire mechanism that must respond to small changes in force since lag measured in milliseconds can cause severe instability. It is the primary object of the present invention to improve the operation of the pilot valve mechanism of a servo-type centrifgual fluid sensing governor (particularly of the liquid pressure sensing type) thus improving the operation of the entire combination of elements. This improvement arises from the elimination of friction in the entire force-sensing mechanism, which force-sensing mechanism includes the pilot valve.

It is another object of the invention to provide a device in which modulated working-fluid pressures are applied to the servo-motor to reduce the tendency of the elements to surge and hunt for the desired final stabilized position.

Another object of the invention is to provide a governor for an internal combustion engine installation in which the restraint imposed by the governor on the operation of the engine may be removed instantaneously at any time at the selection of the operator.

Another object of the invention is to provide a governor for an internal combustion engine which is capable of adjustment to provide either a constant speed throughout the range of loads of an associated engine, or a varying speed at varying engine loads.

Another object of the invention is the provision of a means to establish a fluid governor-setting force the magnitude of which can be varied by the operator to effect a change in governed speed.

Another object of the invention is to provide a hydraulic governor actuating member, or sensing force producing member which is frictionless and free from changes in viscosity of the fluid employed.

Another object of the invention is to provide a governor for an internal combustion engine that is easily adapted to enter connection with like governors in a series of associated engines.

Other objects and advantages of the invention will become apparent from the following description and from the accompanying drawings in which:

FIG. 1 is a diagrammatic sectional view of a governor mechanism applied to a Diesel engine installation comprising a multiplicity of engines;

FIG. 2 is a fragmentary sectional view of a modified form of sensing force developing apparatus usable in the combination shown in FIG. 1;

Figure 3:
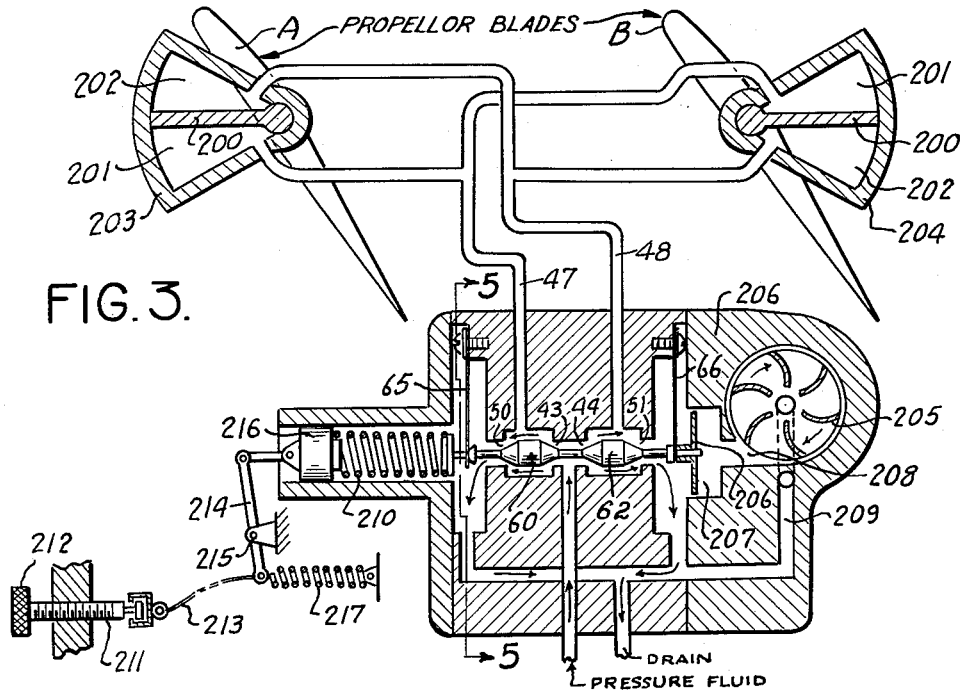
FIG. 3 is a diagrammatic sectional view of a modified form of the invention adapted to control the propellers of an aircraft by regulating the pitch of the propeller blades.
Figure 4:
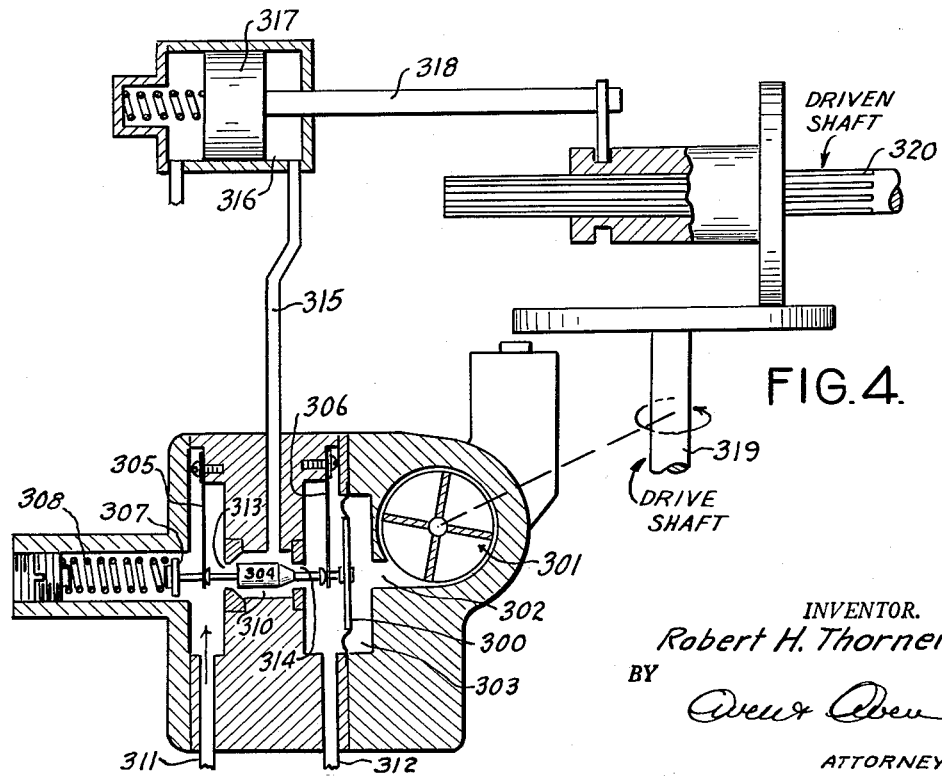
Figure 6:
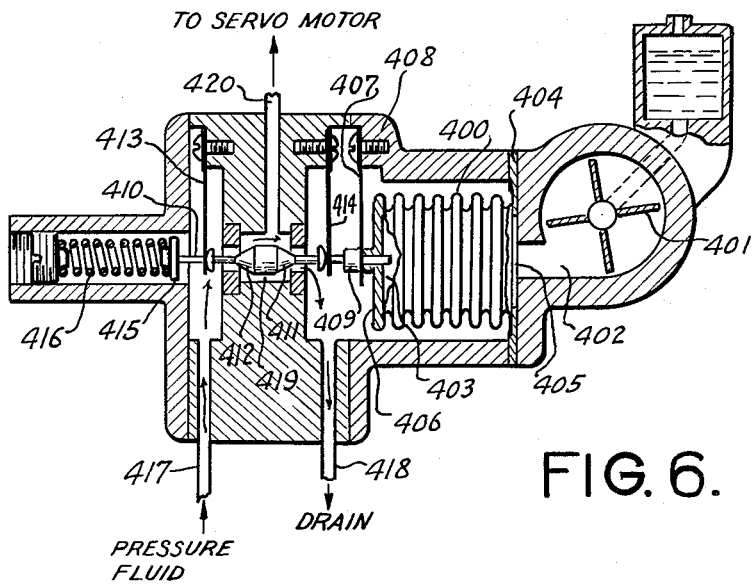
Figure 7:
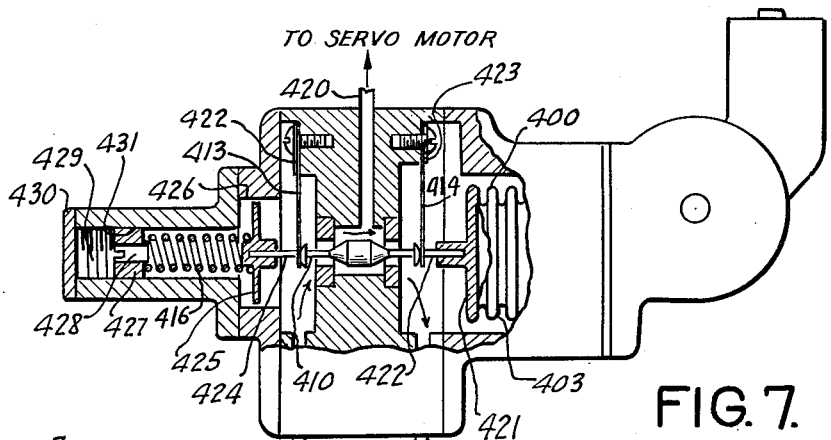
Figure 5:
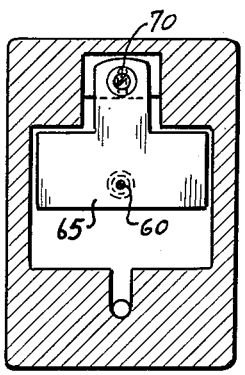

FIG. 4 is a diagrammatic representation of an installation of my improved governor to a ratio-control of an automatic transmission, FIG. 5 is a section on line 5—5 of FIG. 3, FIG. 6 is a fragmentary sectional view of a modification including a bellows type pressure responsive member, and FIG. 7 is a fragmentary side elevation, with parts broken away of a modified form of the invention similar to FIG. 4, but with the bellows type pressure responsive member.

Referring to the drawings, and particularly to FIGURE 1, the present invention is there shown as applied to an installation comprising a plurality of Diesel engines having fuel injection pumps 10 and 10' for the purpose of controlling the flow of fuel to the engines and thus the load developed or carried by each. It will be appreciated that while two engines have been indicated in the figure as the number of engines may be multiplied beyond that number as will become apparent from the description hereinafter.

It will be appreciated that the invention is equally applicable to any other power plant control, such as the throttle of a gasoline engine, a fuel control for jet engines, etc.

The control factor, in the form shown in the drawings, is engine speed which is controlled by the quantity of fuel injected. Thus, conventionally, control of the engine is obtained by varying the rack position of the fuel pump 10, the rack being designated 12. Any suitable power device may be used to actuate the rack, such as a double acting fluid cylinder 14 having a piston 16 therein connected operably to the rack. As a safety measure a biasing spring 18 is introduced to force the rack to the "fuel-off" in the event of failure of the governing circuits.

The governor according to the present invention comprises a liquid centrifugal pump 20 driven by the engine through any suitable type of mechanical connection so as to follow directly all increases and decreases in engine speed. The pump may conveniently take the form of a vaned rotor 22 working in a chamber 24 and having a central liquid supply passage 26. The pressure developed by the centrifugal pump 20 is a function of the speed of rotation of the rotor. The periphery of the rotor is connected by a tangential passage 30 to a chamber 32 one wall of which comprises a frictionlessly distortable or movable member such as diaphragm 34. It will be apparent that the same frictionless response to variations in pressure can be obtained from a bellows or from a disc fitting closely in a passage but out of contact with the walls thereof as will be more fully described hereinafter. It is necessary that the responsive movement of the member 34 be substantially frictionless in order to follow instantaneous changes in pressure developed by the pump, or fluid force developing member 20. The force produced by member 20 is called, hereinafter, a sensing force.

The circuit for power fluid to the first pressure responsive member, which in the form shown is the double acting fluid cylinder 14, leads from a source (not shown) through a conduit 40 to a chamber 42 where the fluid is divided into two streams at orifices 43 and 44 and thence enters chambers 45 and 46 from which connecting tubes 47 and 48 extend to the two sides of the cylinder 14. A supply valve 41 controls the fluid from the source to the balance chamber hereinafter described. Discharge orifices 50 and 51 form the outlet sides of the chambers 45 and 46 and connect to enlarged low pressure chambers 52 and 53. The low pressure discharge chambers are connected, as by a conduit 54, to a return to the source and may also be connected by a bypass conduit 55 to the inlet or central supply passage 26 of the rotary pressure developing pump 20.

A valve piece or pilot valve 60 is provided to control simultaneously the four orifices 43, 44, 50 and 51. The valve piece comprises spaced spools 61 and 62 carried by a single stem and each spool is shaped to coact with the inlet and discharge orifices of the chamber in which it is disposed. Preferably the spools are tapered at each side to effect a gradual closing and opening of the orifices. By moving the valve piece axially, flow is restricted in one orifice at the same time that it is increased through the corresponding orifice on the opposite side of the center line. Thus, as the opening in orifice 43 is increased by movement of the valve piece, the opening of orifice 44 is reduced; and as the opening of orifice 50 is made greater, the opening of orifice 51 is made less. Thus the pressure in one chamber 45 or 46 is decreased as the pressure in the other chamber is increased and these pressures are communicated to the fluid pressure responsive cylinder 14 through tubes 47 and 48.

It will be seen that in the preferred form shown in the drawings, there is a continuous flow of fluid into and out of each of the valve chambers 45 and 46 and that the pressures in the two chambers are modulated by variations in the flow. The pressure in one of the chambers thus increases as the pressure in the other chamber decreases. The respective pressures are transmitted through conduits 47 and 48 to the opposite sides of piston 16 causing the piston to seek a position of adjustment in its cylinder 14. In most fluid systems of this type there is no modulation of pressure, but rather the conventional servo pilot valve is either fully subjected to static pressure or fully closed therefrom.

The discharge from orifices 50 and 51 passes respectively into the discharge chambers 52 and 53 which in turn are connected to the return passage 54 and ultimate return line 64. The chambers 52 and 53 are thus at substantially atmospheric pressure.

The valve piece 60 is mounted for frictionless axial movement, in the form shown, by spaced leaf springs 65 and 66 attached at one end to the valve piece and at the opposite end fixed to a wall of the discharge chambers 52 and 53 by screws 70 and 71. The leaf spring supports flex freely in substantially an axial direction but restrain movement of the valve piece in any other direction. Normally, the contour of the leaf springs may be of uniform width such as 3/8" for example. But if a non-compressible fluid such as oil is used in the power circuit, the contour of the leaf spring supports, in elevation, may take the form as shown in FIG. 5 to supplement the excellent stability characteristics already inherent in the governor. As there indicated each leaf spring comprises a relatively wide lower part and a relatively narrow neck adjacent the screws 70 and 71. In this manner the leaf springs may fit relatively closely to the surrounding walls of the chambers in which they operate to exert a dampening effect on the movement of the valve piece since, when the leaf springs move, it is necessary for fluid to pass around them from one side of the chamber to the other. The valve piece 60 is extended through the discharge chambers into abutting contact with or may be secured to diaphragm 34 which is responsive to the "sensing force" and contact with a second diaphragm 72 which is responsive to an opposing "governor-setting" force.

The virtually frictionless swinging support of the valve piece 60 by the leaf springs is a highly important feature of the present invention. To appreciate its importance it should be understood that a governing mechanism of the type disclosed must operate with extreme rapidity, consistency, and stability if it is satisfactorily to perform its intended governing function. The mechanism shown in the drawings are what may be termed "circle-types" or "loop" mechanisms, in which a variable fact or is controlled in a self responsive manner. Thus in Fig. 1 of the drawings a mechanism is shown which is responsive to variations in speed and which acts to restore the speed of the engine to a predetermined value. The force which starts the mechanism in motion may be the small force difference between the sensing force developed by pump 20 at, for example, 2000 r.p.m. and the force developed by this same pump at 1990 r.p.m. This force difference may be very small, and friction in any of the elements that are made responsive to it may be a critical factor.

The foregoing fact can be better appreciated by considering the step-by-step operation of a typical conventional device, such as the common centrifugal governor operating to maintain essentially constant the speed of an engine with varying loads. The sequence of events in the stabilization process of this type of mechanism may be briefly described as follows:

(1) The speed deviates from the predetermined value by an amount dependent upon the speed of response of the mechanism which, in the conventional centrifugal device, is excessive due to friction in the mechanism.

(2) After a definite time delay depending on the friction of the mechanism, the flyweights respond to actuate the controlling member until a new balance of forces between the flyweight and its opposing spring is established. The force available to actuate the mechanism is not the total centrifugal force of the flyweights, but only the difference between the centrifugal force accompanying the changed speed of the flyweights just before they move, and the centrifugal force of the flyweights after they are stabilized at the new position. This delay is caused by all the friction in the entire mechanism such as the hinges of the flyweights, the contact of the weight noses against the thrust sleeve, and the various linkages for transmitting the force of the flyweights to the controlling member. There are two kinds of friction involved which affect the movement of the parts of the governor. There is a static friction which is developed when the velocity of any part is zero and there is a kinetic friction developed during movement. Frequently the static friction is greater than the kinetic friction. The excessive delaying force due to static friction causes rough operation because the change in velocity in the cycle is not smooth. These delaying forces are what must be overcome.

(3) After the static friction is overcome by the differential force of the flyweights caused by frictional delay, there is a sudden but relatively small acceleration due to the somewhat lower kinetic friction so that the change in velocity is not smooth and tends to carry the mechanism beyond the final desired stabilized position. Although the kinetic friction may be less than the static friction, if the kinetic friction is sufficiently large, it adds to the overall delay of the governor. If the delay is too great, this effect will be sufficient to cause over-travel so that surging and hunting will occur.

Any governing system has a tendency to surge beyond and to hunt for the corrected position, and friction in the system accentuates this tendency. This has long been known in the industry and attempts to reduce the friction in governing mechanisms to a "negligible" value have resulted in very expensive and complicated devices. It has not, however, been appreciated that only a "negligible" sensing force is available to overcome the "negligible friction" if the governor is to be truly stable, and that friction to be truly "negligible" must itself be very small with relation to the small sensing forces available.

Adjustment of the governor of the present invention may be accomplished in various known ways. If the governor is to be used as "full range" device operating to maintain constant any desired speed from idle to full speed, means may be provided to establish a variable fluid pressure acting in opposition to the movement of the valve piece 60 together with means to vary the pressure, to change the speed of operation of the associated engine. In FIG. 1 of the drawings such a device is shown as including a balance chamber 80 having one flexible wall in the form of the diaphragm 72 against which bears the extension of the valve piece 60. The chamber 80 is fed fluid through a branch supply conduit 85, the pressure being dropped by an orifice 86. Discharge from the chamber is controlled by a needle valve 87 cooperating with a discharge orifice 88 which empties into a return passage 89. The needle valve 87 is normally urged outwardly by a spring 92 against an accelerator lever system comprising a bell crank lever 93 pivoted at 94 and attached to a link 95. Link 95 may attach directly to an accelerator pedal 96 pivoted at 97 in the usual manner. An extension of bell crank lever 98 may cooperate with an adjusting screw 99 to form a convenient idle adjustment.

It will be apparent that the pressure in chamber 80 acting on diaphragm 72 is determined by the position of the needle valve 87 since the flow into the chamber is through the constant orifice 86; that if the valve is moved towards a closed position the pressure in chamber 80 will increase, while an opening of the needle valve will cause a reduction in the pressure in the balance chamber 80 for the purpose hereinafter described.

The maximum governed speed is determined by any suitable pressure regulator device which will serve to limit the maximum pressure that can be built up in the balance chamber 80 to act in opposition to the pressure of pump 20 which increases with engine speed. Such pressure regulator may comprise a spring 100 bearing against a ball check or relief valve 101 normally closing a parallel conduit 102 which is open at one end to the balance chamber and at its opposite end to discharge passage 89, and is in parallel with the orifice controlled by needle valve 87. In the event that needle valve 87 is moved to such an extent that its orifice is substantially closed the pressure in balance chamber 80 increases to the point where the relief valve 101 opens to discharge some of the fluid to the exhaust conduit 89. It will thus be seen that the relief valve will automatically maintain a constant maximum pressure in the balance chamber and thus establish a maximum speed at which the engine may be operated. The limiting value is regulated by changing the force of spring 100 by means of an adjusting screw 103, which may be sealed in an adjusted position, if desired to prevent tampering. If desired, especially for stationary engines, the needle valve 87 may be omitted and the speed can be controlled by adjusting the spring 100 so that the ball valve 101 is in series with the orifice 86 and serves the same function as the needle valve 87. However, the pressure regulator action would maintain a more constant pressure in chamber 80 than valve 87 completely independent of changes in oil viscosity.

As above noted, the pressure developed by pump 20, the sensing force, is a consistent function of speed, and the "governed speed" is very sharply defined for each setting of the control needle valve. Under these circumstances the maximum governed speed, for example 2000 r.p.m. would be substantially the same regardless of the load on the engine. Under some conditions it is desirable that the engine speed increase somewhat with an increase in load, or that it fall off slightly. The characteristics may be controlled by controlling the pressure characteristics of the pump 20. To this end, if desired, the present invention may provide a bypass passage 110 from the sensing force chamber 32 to the discharge conduit 64 which passage is controlled by a needle valve 112 connected by a lever 114 to the fuel rack 12. The lever is pivoted at 115 intermediate its ends to reverse the motion of its ends and provide a closing movement of the needle valve with a fuel-reducing movement of the fuel rack 12. Thus the pressure in chamber 32 is permitted to build up to a higher value at low engine loads than at high engine loads since at low engine load less of the pressure is dissipated past the needle valve 112. At high engine loads a higher governed engine speed will occur since some of the pressure in chamber 32 will be dissipated in flow through the bypass conduit 110 so that the vane 22 and hence the engine must rotate faster to balance the pressure in chamber 80. If the reverse speed-droop characteristics are desired, it is only necessary to change the fulcrum of lever 114 or to reverse the contour of valve 112 so that at higher loads when the rack 12 moves leftwardly as viewed in FIG. 1, the valve 112 reduces its opening in conduit 110.

If the loading curve is to be anything but a sharp, constant maximum curve, there will be flow through pump 20 into the bypass conduit 110. Thus a supply conduit must be provided for the pump 20, and such a conduit is shown at 116 in FIG. 1, communicating with the hub portion of the pump and with the return or discharge conduit 63.

If no such expedient is desired to alter the sharp governing characteristics of the governor, pump 20 may be supplied (with liquid) from a simple reservoir 120 as shown in FIG. 2 without any outlet from the chamber other than the tangential passage 30 leading to chamber 32. However, fluid may be taken from the low pressure outlet conduit 55 if desired, it being only necessary to supply the centrifugal rotor with enough fluid to make up the increased volume caused by movement of the pressure responsive member 34. In either event the supply from the reservoir 120 or from the low pressure outlet conduit communicates with the centrifugal member in the region of its axis of rotation by a passage such as passage 121 in FIG. 2.

The particular combination of elements shown in FIG. 2 has many advantages, particularly where the governor is to be used in various ambient temperatures. Since the pump 20 operates in a closed chamber and there is no flow of fluid (preferably liquid) into or out of the chamber except that required by the slight displacement of the diaphragm 34, the unit is essentially insensitive to changes in viscosity and thus the temperature of the working fluid. In this form, where liquid is used as a working fluid, the individual masses trapped between the vanes of the pump act in a manner similar to centrifugal flyweights, being thrown out against the diaphragm 34. It will be seen also that the region of the hub of the pump is at low pressure and that, therefore, the leakage is negligible over a long period of time and a very small reservoir may be used.

In the operation of the form shown in FIG. 1, the pump 20 is driven either directly by or at a speed directionally proportional to the speed of the engine to be governed. The pressure developed in the tangential passage 30 and chamber 32 by movement of the vaned rotor in its chamber is thus a consistent function of engine speed. The pressure in chamber 32 causes a distortion of the diaphragm 34 which forms a wall of that chamber, which distortion takes place without friction so that very small changes in the force developed by the pump can be followed by the diaphragm.

The end of valve piece 60 bears directly against the center of diaphragm 34 and thus follows each small movement thereof. Since the valve piece is mounted for frictionless axial movement by the spaced leaf springs 65 and 66, this ability to respond to small changes in the position of the diaphragm and thus small changes in the speed of the engine is very pronounced.

The stable position of the valve piece is that in which the pressure in chamber 46, which is in communication with the cylinder 14 to the right of piston 16, is equal to the sum of the forces on the piston exerted by spring 18 plus the forces due to fluid pressure transmitted to the space to the left piston 16 from chamber 45. Since the force of spring 18 may be made negligible with respect to the fluid forces due to pressures transmitted to the power cylinder from chambers 45 and 46, it can be said that the valve piece stabilizes in a substantially central position with respect to the orifices which it controls; the amount of offset of the valve being only sufficient to balance the small spring force.

If the speed of the engine increases beyond the governed speed (at which the valve piece 60 is stabilized) the output pressure of pump 20 increases, causing diaphragm 34 to move to the left.

Movement of the valve piece 60 to the left causes a diminution of pressure in chamber 46 because the valve piece restricts the inlet orifice 44 and at the same time that it acts to increase the opposite inlet orifice 43 while restricting the associated outlet orifice 50. Thus the pressure in chamber 46 falls while the pressure in chamber 45 rises. Piston 14 thus moves to the right to decrease the fuel and reduce the engine speed.

The stabilized position of valve piece 60 is always as above noted, essentially central of the orifice system which it controls. It will be noted that the valve in this form of governor illustrated in FIG. 1 is not required to seek a new stable position for each change in governed speed. In the form of the invention shown in FIG. 1, the "governed speed" may be determined by balancing the pressures acting on the two ends of the valve piece 60; in one direction the pressure of pump 20 and in the other direction the pressure of balance chamber 80. The pressure from pump 20 is, as above noted, a function of engine speed, while the pressure in balance chamber 80, in the form shown in FIG. 1, is dependent on the position of needle valve 87 (or the setting of spring 100 if the needle valve 87 is omitted) which, in turn may be manually controlled by an "accelerator" pedal, if the installation is on an automotive vehicle, or by any other suitable control lever. The governed speed will vary with each new position of the accelerator pedal and concomitant setting of the needle valve 87, and will remain substantially constant at each setting, but the maximum governed speed is determined by the setting of the spring 100 that keeps ball relief check 101 on its seat. Beyond the speed represented by the pressure in the balance chamber 80 required to unseat the check valve 101 the operator is restrained from increasing the speed by the opening of the relief valve.

As explained above, it is desirable in a fluid servo-speed-governor to eliminate completely all lag in the operation of the speed sensing mechanism. The term "sensing mechanism," which will be used hereinafter, defines the mechanism including the speed-responsive actuating-means such as diaphragm 34, the pilot valve, the biasing means opposing the force of the speed-responsive means such as diaphragm 72 or its equivalent, and the various connections of these means.

The conventional servo-mechanism in a speed governor responds substantially more slowly and, more important, with much less consistency than does the device of the present invention when the rotary speed deviates from the predetermined value. After a definite time interval, the speed-sensing mechanism responds to the deviation, but in the presently known units this time interval is relatively long due to the contact between the pilot valve and its cylinder as well as friction in other parts of the sensing mechanism, as described above.

Further, it is most important to appreciate that, as in the centrifugal governor described above, the sensing mechanism must change its direction of motion at least twice to complete its stabilizing cycle and that it is stationary at each of the two extremities of its travel. The sensing mechanism is thus also subject to both static and kinetic friction. When the sensing mechanism is at the end of each minute stroke in one direction it comes to a complete stop and must then reverse its direction of motion and start again. Before the sensing mechanism can move from its stationary position it is subject to static friction, and while it is in motion between its extremities of travel it is subject to kinetic friction. As explained previously, the static friction may be greater than the kinetic friction so that there is frequently a greater delaying force at the extremity of travel than during the movement of the mechanism. The effect of this excessive delaying force due to static friction not only is magnified because of the amplifying action of the servo-mechanism, but it causes rougher operation since the change in velocity of the sensing mechanism is not smooth. In the present invention, the spring-suspended pilot valve in combination with a speed-responsive disc, or a large diaphragm or bellows to actuate the pilot valve, has substantially no frictional resistance; hence the change in velocity is smooth and without lag due to either static or kinetic friction because these factors are not present.

In present servo-mechanisms in speed-governors, particularly those in which unmodulated working fluid is applied to the pressure responsive member, that member and its cooperating controlling member after overcoming the static friction move suddenly at high velocity toward and beyond the desired stabilized position of the control member, which rapid movement may be assisted by unmodulated, continuously applied high pressures. Thus the control member of the presently known mechanisms tends to move excessively beyond the desired final stabilized position primarily because of the cumulative action of the lag due to friction in the sensing mechanism, and the condition is made worse if unmodulated high pressures are applied to the control member. Excessive travel of the control member makes it necessary that the sensing mechanism respond to an excessive reverse deviation of the variable factor and direct the fluid flow in a direction tending to bring the control member back to the desired position. However, because of the frictional characteristics of the sensing mechanism, again a delay is produced, the effects of which are amplified by the servo-mechanism.

Attempts to solve this problem have, in many instances, taken the form of the addition of certain mechanism made sensitive to a change in position of the control member which in effect temporarily tend to stop or reverse the pilot valve movement sufficiently to stop the travel of the control member at or near the anticipated final desired position; and when the control member is in this position the added mechanism is made inoperative. These mechanisms add to the expense of the unit and further complicate matters by the addition of new factors of friction so that the size and complexity is increased and the dependability of the unit is decreased.

In the governor of the present invention the sensing mechanism is made considerably simpler and of substantially reduced size by the inclusion of the leaf-spring-suspended pilot valve 60, which valve, in the forms shown, serves to modulate the pressures directed to the servo-motor 14, in combination with a substantially frictionless speed-responsive valve-actuating member, such as a large diaphragm 34, and substantially frictionless biasing means, such as diaphragm 72, in FIG. 1, or spring 308 in FIG. 4. In the forms shown, the bleed-principle of pressure control is utilized to provide modulated pressures for the servo-motor so that during stable operation there is a continuous flow of fluid through a circuit having two orifices with at least one of the orifices variable to modulate the pressure differential actuating the pressure responsive member. In addition the variable orifices are controlled by a pilot valve suspended by leaf springs to eliminate all surface frictional contact. The sequence of events in the stabilization process of the governor of the present invention may be briefly described as follows:

(1) The speed deviates from the predetermined value.

(2) After a definite time delay, the sensing mechanism responds to the aforementioned deviation. Since the sensing mechanism is substantially frictionless, the response is virtually instantaneous. This fast response causes the control member to start correcting its position immediately so that it does not have to make a sudden correction, as required by a lagging pilot valve. Since there is no static friction to delay the movement of the sensing mechanism at the extremities of its travel, and there is no kinetic friction when in motion, the change in velocity of the sensing mechanism in its minute oscillatory movements is completely smooth, and the tendency for rough operation and "hunting" is substantially eliminated.

(3) When the pilot valve is moved from its stabilized position, in the forms shown, modulated fluid pressures are applied to the servo-motor; the value of these pressures may vary anywhere from zero to the full pressure of the source depending on the travel-position of the pilot valve. Thus the control member can be caused by the pilot-valve to move at various required speeds and to any required distance. If only a small correction is required, the pilot-valve moves only a small distance to produce the required change in pressure in the servo-motor. If a large correction is required, the pilot valve makes a somewhat longer travel to produce the required higher pressures in the servo-motor.

(4) The control member in the present invention does not tend to over-travel excessively beyond the desired final stabilized position because:

(a) as described above, the time interval before the pilot-valve responds is substantially zero.

(b) In the forms shown, modulated pressures are directed by the pilot valve to the servo-motor so that the velocity of movement of the servo-motor is not excessive.

(c) If the control member moves past the neutral position, the sensing mechanism again responds substantially instantly to the reverse deviation from the neutral value of the variable factor to reduce any tendency of the control member to overtravel, which has already been minimized because of the foregoing factors.

It is thus apparent that all of the above desirable factors in the present invention enhance each other and that their effects are cumulative. Accordingly the present invention is directed to the combination of elements to give the above desired results.

In the event that the operator, as an emergency measure, finds it imperative to remove the restraint of the governor from the operation of the engine, such, for example, as in automotive operation, the present invention includes a direct-acting device which will permit him to do so. This is accomplished by removing the limiting function of the relief valve 101 by closing off passage 102 to permit the pressure in the balance chamber 80 to build up. A simple valve 106 in the passage 102 may be used, and the valve may be connected to a ring 107 within easy reach of the operator. Since removal of the governor is an unusual and emergency expedient, a seal 108 is provided to indicate when the operator has overridden the governor.

FIGURE 1 also shows the application of the present invention to a multiple engine installation. A second fuel pump 10' is disclosed, its rack 12' being connected to a second power cylinder 14'. The governor is designated generally by the reference character B and is similar in all respects to the governor previously described. The pump within the governor will be, of course, driven by the second engine which is not shown. The governor B is provided with its own supply conduit 40' having a supply valve 41' and with its own drain conduit 64' and with its own needle valve adjustment 87'.

Each of the governors is provided with a shutoff 81 associated with its balance chamber 80, the valves being closed when each governor is used to control its associated engine and opened when the engines are to be controlled from a single governor.

When the engines are to be controlled together the valves 81 are opened and the needle valve 87' of the governor B is closed. The supply valve 41' associated with conduit 40' is also closed so that the fluid in the balance chamber of governor B is completely trapped and is only in static communication with the corresponding balance chambers of the other governors. This fluid will be at the same pressure as the fluid in the balance chamber 80 of the master governor and any change in pressure in the balance chamber of the master governor is instantly reflected as a change in the static pressure in the corresponding chamber of the governor B with little or no flow in the connecting conduit between the two governors. Hence all engines may be operated at the same speed by a single control independent of changes in ambient temperature and the viscosity of the working fluid. If preferred, different size balancing diaphragms may be used wherein the speeds of the connected engines are proportional but not synchronous.

The connecting conduit between the governors is designated C and may be extended in the direction of the arrow D to connect with similar balance chambers of governors on other engines in the group. It will be apparent that any governor may be made the master governor of the group by closing the supply valves 41 and the appropriate needle valves 87 of the other governors and that any governor may be cut out of the group so that its engine is independently controlled by closing the valve 81 to the intercommunicating conduit C and opening valve 41.

FIGURE 3 illustrates diagrammatically the application of the present invention for controlling an internal combustion engine by varying the blade pitch of a propeller attached thereto. In FIG. 3, the engine controlling means is a propeller in which the pitch of the blades are variable and controllable by the governor, so that the blades correspond to the fuel control rack 12 in FIG. 1. In FIG. 3, the blades A and B represent two blades of a two-bladed propeller in which each is viewed diagrammatically from the hub. The blades are secured to and actuated by vanes 200 that form chambers 201 and 202 respectively within housings 203 and 204. The governor operates to maintain the pitch of each of the two blades exactly the same.

The governor construction is much the same as the construction described in connection with FIG. 1 and includes a pump 205 driven by the engine so that its output pressure increases with engine speed.

However, in this form of the invention, I have shown a disc 206 forming a wall of a chamber 207 at the outlet side of the tangential passage 208 from pump 205. The disc fits closely with peripheral clearance adjacent the walls of chamber 207 and is carried by the end of the valve piece 60. Since the disc is out of contact with its surrounding walls there is no frictional resistance to its movement in a direction axial of the valve piece, and, as the valve piece is also suspended for frictionless movement by the leaf springs 65 and 66, it will be seen that the sensing mechanism is, again, entirely without friction.

The disc 206 of course permits a flow of fluid around its periphery so that a supply passage 209 must be provided for the pump 205, entering centrally thereof.

In the form of the invention shown in FIG. 3, the fluid balance chamber is dispensed with and the pressure required to balance the force created against disc 205 is derived from an adjustable spring 210 which is secured to one end of the valve piece 60 and is maintained out of contact with all other metallic parts so that it is supported at its free end, by the leaf springs 65, 66. The initial compression of the spring, and hence the selectable spring force is adjustable by means of an adjusting screw 211 having a knob 212 available to the operator and a flexible connection 213 to a lever 214 pivoted at 215 and connected at one end to a spring follower 216 and at its opposite end to the flexible connection 213. At this latter point a biasing spring 217 may be connected to maintain the system under tension.

With the adjusting screw 211 and hence the spring follower 216 in a fixed position, this form of governor operates as follows: The pressure in the passage 48 caused by the flow of fluid through orifices 44 and 51 is transferred to both chambers 202. Also the pressure in conduit 47 caused by the fluid flow through orifices 43 and 50 is transferred to both chambers 201. When the airplane descends, the engine load decreases so that the engine speed tends to increase. This increase in speed causes the value piece 60 to move slightly to the left as viewed in FIG. 3 whereby the pressure in chambers 201 is increased and the pressure in chambers 202 is decreased. The vanes 200 therefore are moved in a clockwise direction whereby to increase the pitch of the propeller blades A and B respectively thereby reducing the engine speed to the governed value. Conversely, when the airplane climbs, the engine load increases so that the engine speed decreases slightly. This decrease in speed causes the valve piece 60 to move to the right whereby the pressure in chambers 201 is decreased and the pressure in chambers 202 is increased and the vanes decrease the pitch of the blades to increase the engine speed to the governed value.

The propeller blades A and B always have the same pitch even though they are mechanically independent of each other. The blades are designed so that the aerodynamic and centrifugal forces exert a counter clockwise torque on the blades tending to move them into the low pitch position as viewed in FIG. 3. The value of this torque varies with propeller speed so that to maintain both blades in a stable position, the governor must automatically adjust the valve piece 60 to provide a slight pressure differential across the vanes 200 in each of the two housings to balance exactly the aforementioned aerodynamic torque bearing on each blade. Since the pressures in conduits 47 and 48 and in chambers 201 and 202 are static, the pressure differential across each vane is exactly equal to the pressure differential across the other. If, at the governed speed, the pitch of blade A is greater than the pitch of blade B the aerodynamic torque on blade A would be greater than the aerodynamic torque on blade B, but since the pressure differential across the vanes 200 must be equal at each instance, whereas the aerodynamic torques are unequal, the blades cannot be in a stable condition. Under these circumstances the aerodynamic torque on blade B will be less than the torque due to the fluid pressure differential across the vane associated with it whereas the aerodynamic torque on blade A will be greater than the torque due to the fluid pressure differential across the vane 200 associated with it. Because of this unbalance the pitch of blade B increases and the pitch of blade A decreases until the aerodynamic torque of each blade is balanced at the same value and at this value the blade pitch must be equal. If a three or four blade propeller is used with the governor of the type shown in FIG. 3, all of the blades are regulated in the same manner.

In the form of the invention shown in FIG. 4, the frictionless diaphragm 300 is made responsive to the pressure developed by pump 301 operating in a chamber having as its only outlet the tangential passage 302 communicating with chamber 303 of which the diaphragm forms one wall. In this form a valve piece 304 having two valve faces is used in place of the four valve unit shown in FIG. 1, being again supported by spaced leaf springs 305 and 306 and at one end secured to diaphragm 300 and at the opposite end against a disc 307 carried by adjusting spring 308.

The valve piece 304 controls the flow of fluid into and out of a chamber 310, from a supply conduit 311 to a discharge conduit 312. In the form shown, the valve piece, at its inlet side cooperates with a tapered orifice 313. The valve piece is made cylindrical at the inlet end and is conical at the outlet end adjacent a rectangular outlet orifice 314. The configuration of this combination of valve faces and orifices maintains substantially constant the sum of the static and fluid-dynamic forces produced by the fluid controlled by the valve piece and acting thereon throughout the entire range of movement of the valve. Tests using air as a working fluid, have shown that a valve piece and its associated orifices of the described configuration result in a substantially constant fluid force acting on the valve due to the flow of fluid controlled thereby over a wide range of operation.

The pressure in chamber 310 is transmitted through a conduit 315 to a power cylinder 316 having a piston 317 therein connected to the mechanism to be operated by a rod 318. In this instance rod 318 is attached to one element of a variable ratio drive (diagrammatically disclosed) comprising a driving member 319 and a driven member 320. Pump 301 is connected by any suitable means to the driving member 319 and the governor operates to maintain a constant rotative speed of an engine or other rotating member. In some instances, the pump 301 may be driven by the shaft 320 rather than by shaft 319 whereby the output speed is maintained constant while the driving speed is varied by the variable drive ratio.

In operation, assuming the drive to be operating at constant speed and at a desired ratio, if the load is increased, the speed of the driving engine tends to drop slowing pump 301. As pump 301 slows, there is a small reduction in pressure on diaphragm 300 and valve piece 304 is moved to the right by spring 308. As the valve piece moves to the right, orifice 314 is restricted and inlet orifice 313 is opened farther, increasing the pressure in chamber 310. The increased pressure in chamber 310 is instantly reflected in cylinder 316 causing the piston 317 to move to the left, altering the drive ratio by decreasing the effective radius of the drive plate connected to drive shaft 319. This restores the engine speed to its governed value, and thus restores the speed of the pump 301.

The embodiment of my invention shown in FIG. 4 is similar to the form shown in FIG. 3 if the pump 301 is driven by the shaft 319 rather than 320. In both instances the engine speed is maintained constant by reducing the torque output if the speed tends to reduce and increasing the torque output if the speed tends to increase. Such an arrangement of my invention may be used whenever it is desired to operate an engine automatically at its maximum permissible engine speed or at any one engine speed at all loads and to get the maximum output speed from the transmission under such conditions in order to get the most from the engine. Practical examples could be in using an internal combustion engine in a hoisting or elevator device. If in each hoisting operation, the load is varied, the present speed control would automatically compensate for this variation to raise the load as fast as the engine will permit.

The governor of the form shown in FIG. 4, wherein a single chamber is used to develop the control pressure for the power cylinder, is not capable as shown of producing as close regulation as the form of the invention shown in FIG. 1, but is desirable because of its great simplicity in those installations where a slight decrease in speed with increase load, or speed "droop" can be tolerated. The degree of the "speed droop" can be altered somewhat by changing the rate of the balance spring 308, a lower rate spring giving closer regulation than a higher rate spring, and also by changing the valve travel, a longer valve travel producing a broader governor for a given spring.

In the form shown in FIG. 4, the spring behind the power piston 317 opposes the pressure which is directed to the piston by the two valves on the valve piece 304. In order for the piston to be repositioned to the right, for example, as required with a change in load, the pressure must reduce in the conduit 315 and chamber 310 which can only be produced by a transposition of the valve 304 to the left which in turn causes a slight increase in the force of the spring 308. This latter increase in force requires a corresponding increase in fluid pressure in chamber 303 which requires that the speed of the driving member 319 increases somewhat with a decrease in load.

This may be compared with the form shown in FIGS. 1 and 3 wherein both sides of the pressure responsive member of the servomotor are controlled each by two of the four valves of the valve piece. In these forms the piston of the pressure responsive member is stable under conditions of a balance of fluid pressures produced by the valves. It will be seen that instead of the transposition of the valve piece with a change in load, the valve piece in these forms makes an excursion to one side or the other depending on whether the speed of the engine increased or decreased and returns substantially to the initial position when the speed of the engine returns to its governed speed. Since the spring 210 in FIG. 3, for example, is in substantially the same position at all stable positions of the governor, the regulation is substantially independent of the rate of the spring 210.

In the form of the invention shown in FIG. 6 which illustrates a modified portion of the form shown in FIG. 4, the frictionless metallic bellows 400 is made responsive to the pressure developed by the vaned rotor 401 operating in a chamber having as the only outlet the tangential passage 402 communicating with chamber 403 which is the interior of the bellows 400 (shown cutaway). The bellows is connected by soldering, for example, to a plate 404 having an opening 405 connecting the outlet of the pump with the sealed interior of the bellows. An end-piece 406 is secured to the end of the bellows by suitable means. A leaf spring 407 has one end secured to the casing 408 and the other end secured to the end-piece 406 by a flat-headed pin 409 which may be press-fitted and soldered to the end-piece as illustrated wherein the leaf spring is clamped tightly between the head of the pin and the end piece. This novel construction supports and guides the free end of the bellows for frictionless axial movement.

The flat head of pin 409 abuts against the pilot valve 410 which has two valve faces 411 and 412, being again supported by spaced leaf springs 413 and 414 and secured to the disc 415 carried by adjusting spring 416. The pressure fluid circuit, as in the form shown in FIG. 4, comprises pressure fluid passing through conduit 417, through the orifices controlled by the valve faces 412 and 411, and out conduit 418 at substantially atmospheric pressure. Modulated pressure in chamber 419 is controlled by the valve faces and is transmitted through conduit 420 to a power cylinder which is not shown but may be identical to the power cylinder illustrated in FIG. 4 wherein conduit 420 of FIG. 6 corresponds to conduit 315 of FIG. 4, for example.

The operation of the device is the same as in the other forms of the invention, wherein an increase in speed of the controlled machine causes the vaned rotor 401 to increase the pressure in bellows chamber 403 whereby the bellows 400 expands to move the valve 410 to the left, as viewed in FIG. 6, whereby the inlet orifice opening is reduced and the outlet orifice opening is increased to reduce the pressure in chamber 419 so that the piston 317, see FIG. 4, moves the control means of the machine to restore the original governed speed. This form of the invention has particular value in applications where the temperature of the pressure-fluid circuit is very high which may cause damage to a diaphragm, and the viscosity variations of the fluid would cause corresponding speed variations if a disc were used in such applications.

FIG. 7 is a modification of the form of the invention shown in FIG. 6, wherein the end-piece 421 which is secured to the free end of the bellows has a bore which receives with a slip-fit an extension 422 of the pilot valve 410 whereby the free end of the bellows is supported by the leaf springs 413, 414, which also support the pilot valve 410, thus reducing the number of parts and providing a more rigid support for the free end of the bellows. The effective length of the spring 413 may be shorter than the length of the spring 414, as shown; this construction causes a greater rise of the valve at the support of spring 413 than at the support at spring 414 as the valve moves in either direction from mid-position, so that the side bending movements of the bellows are minimized. The springs 413 and 414 are preferably clamped in place by the anti-torque plates 422 and 423, respectively, by means of screws as shown.

FIG. 7 also shows a frictionless dash-pot which may be used in any of the forms of the invention to add to the stability characteristics already inherent in the governor. An extension 424 of the pilot valve 410 fits closely in a bore of a disc 425 so that for operative purposes, the disc and valve operate as a unit. The disc has a close perimetral clearance with a cylinder 426, and supports the movable end of the spring 416 whose compression is determined by adjusting screw 427 to establish the governed speed of the machine controlled thereby. The adjusting screw includes a through-bore 428 to provide an enclosed pressure-fluid chamber 429 formed by a cover 430, internal-threaded member 431, bore 426, and disc 425. The disc in effect is supported by the leaf springs for frictionless movement since it is out of contact with cylinder 426, and thereby forms a frictionless fluid dashpot as a result of the movements of the pilot valve 410 in displacing fluid to and from chamber 429.

What I claim is:

1. A control device to actuate a movable controlled member comprising, a first pressure responsive member to actuate said controlled member, rotary means to produce forces which are a function of the speed of rotation thereof, a pressure fluid circuit communicating with said first pressure responsive member, valve means in said circuit actuated by the forces produced by said rotary means to direct the pressure fluid to said first pressure responsive member to effect movements thereof, a pressure chamber, a fluid pressure actuated member comprising a movable wall of said chamber and acting on said valve means to oppose the forces produced by said rotary means, said chamber having inlet and outlet orifices for the flow of fluid therethrough, means to vary the aperture of at least one of said orifices, whereby the pressure in said chamber may be varied to establish different forces opposing the forces produced by said rotary means to establish a predetermined position of said valve means and hence of the controlled member.

2. A control device in accordance with claim 1 in which said pressure chamber is further provided with a pressure relief valve to establish a predetermined maximum for the pressure in said chamber.

3. A control device in accordance with claim 1 in which said pressure chamber is provided with a pressure relief valve to establish a predetermined maximum for the pressure in said chamber, and emergency manually operated means to block said pressure relief valve.

4. Means to govern the speed of a plurality of rotating machines comprising a governor associated with each machine, each said governor having a first pressure responsive member operatively connected with a control member to regulate the speed of rotation of the associated machine, rotary means in each governor driven by the associated machine to produce forces which are a function of the speed thereof, a fluid circuit communicating with said first pressure responsive member, valve means in said fluid circuit actuated by the forces produced by said rotary means to direct pressure fluid to said first pressure responsive member to effect speed-controlling movements thereof, a second pressure responsive member in each governor acting on its respective valve means, a source of fluid pressure acting on said second pressure responsive member to produce forces opposing the forces produced by said rotary means, and means to provide fluid communication between the respective second pressure responsive members in each governor for transmitting said last-named fluid pressure, whereby a variation in opposing pressure in one governor is immediately reflected as a variation in the opposing pressure in the connected governor.

5. Means to govern the speed of a plurality of rotating machines comprising, a governor associated with each machine, each said governor having a first pressure responsive member operatively connected with a control member to regulate the speed of rotation of the associated machine, rotary means in each governor driven by the associated machine to produce a fluid pressure which is a function of the speed thereof, a second pressure responsive member responsive to the fluid pressure produced by said rotary means, a fluid circuit communicating with said first pressure responsive member, valve means in said fluid circuit to direct pressure fluid to said first pressure responsive member to effect speed-controlling movements thereof, said valve means including means to provide operative connection of said valve means and said second pressure responsive member, a third pressure responsive member acting on said valve means in each governor, a source of fluid pressure acting on said third pressure responsive member to produce forces opposing the forces produced by said rotary means, and means to provide fluid communication between the respective third pressure responsive members in each governor for transmitting substantially statically said last-named fluid pressure, whereby a variation in opposing pressure in one governor is immediately reflected as a variation in opposing pressure in the connected governor.

6. Means to govern the speed of a plurality of rotating machines comprising, a governor associated with each machine, each said governor having a first pressure responsive member operatively connected with a control member to regulate the speed of rotation of the associated machine, rotary means in each governor driven by the associated machine to produce a fluid pressure which is a function of the speed thereof, a substantially frictionless second pressure responsive member communicating with the fluid pressure produced by said rotary means, a fluid circuit communicating with said first pressure responsive member, valve means in said fluid circuit to direct pressure fluid to said first pressure responsive member to effect speed-controlling movements thereof, said valve means including means to provide operative connection of said valve means and said second pressure responsive member, substantially frictionless swingable means disposed to impart rigidity in one direction to constrain said valve means for substantially frictionless movements in a direction substantially transverse to said first direction and for frictionless suspension within the fluid controlled thereby with only fluid contact at the flow controlling surfaces thereof during operational movements, a substantially frictionless third pressure responsive member acting on said valve means in each governor, a source of fluid pressure acting on said third pressure responsive member to produce forces opposing the forces produced by said rotary means, and means to provide fluid communication between the respective third pressure responsive members in each governor for transmitting said last-named fluid pressure, whereby a variation in opposing pressure in one governor is immediately reflected as a variation in opposing pressure in the connected governors.

7. The combination of elements defined in claim 5 in which said rotary means comprises a centrifugal pump, and said second pressure responsive member comprises a diaphragm forming a wall of a closed chamber subject to the output pressure of said pump, and a fluid connection between said chamber and said pump, said fluid connection constituting the sole outlet for fluid moved by said pump.

8. The combination of elements defined in claim 6 in which said swingable means to support said valve means comprises a pair of spaced substantially parallel leaf springs.

9. In a governor for controlling the speed of an engine having a control member to regulate the speed thereof throughout a predetermined range of engine load, the combination of means to actuate said control member comprising, a pressure responsive member connected to said control member operatively for actuation thereof, a device including rotary means driven by the engine to produce forces varying as a function of engine speed, said device including a member movable in response to changes in speed, a fluid circuit having two restrictions therein, said pressure responsive member communicating with said circuit at a point between said two restrictions, valve means in said circut connected to said movable member to vary the restrictive effect of at least one of said two restrictions for modulating the fluid pressure acting on said pressure responsive member in response to changes in engine speed, whereby to effect speed-controlling movements of said control member, and means actuated with said control member to modify the net forces acting on said valve means in a direction tending to reduce the governed speed as the said engine load reduces and tending to increase the governed speed as said engine load increases.

10. In a governor for a rotating machine having control means to regulate the speed of rotation thereof, the combination of means to effect movement of said control mean comprising, a first pressure responsive member operatively connected to said control member for actuation thereof in response to changes in speed, means to produce a force varying as a function of the rotary speed of said machine, a pressure fluid circuit communicating with said first pressure responsive member, valve means in said circuit actuated by said forces produced as a function of the rotary speed of said machine to direct pressure fluid in said circuit to said first pressure responsive member for effecting speed-controlling movements thereof, a second pressure responsive member acting on said valve means to oppose said forces effecting movements of said valve means in response to changes in speed, a fluid circuit having inlet and outlet restrictions therein, said second pressure responsive member communicating for pressure control with said last-named fluid circuit at a point between said two restrictions, means to vary the restrictive effect of at least one of said restrictions to control the balancing pressure in said circuit acting on said second pressure responsive member for establishing the balanced position of said valve means and thereby to determine the governed speed of said machine.

11. A control device to actuate a movable controlled member in response to changes in a controlled condition comprising, a pressure responsive member to actuate said controlled member, substantially frictionless means to produce a force varying as a function of said controlled condition, a pressure fluid circuit communicating with said pressure responsive member, valve means in said circuit movable in response to changes in said controlled condition to direct pressure fluid to said pressure responsive member for effecting movements thereof, substantially frictionless swingable means imparting rigidity in one direction to constrain said valve means for substantially frictionless movements in a direction substantially transverse to said first direction and for frictionless suspension within the fluid controlled thereby with only fluid contact at the flow controlling surfaces thereof during operational movements, a substantially frictionless pressure actuated member acting on said valve means to oppose said forces varying as a function of said controlled condition, a fluid circuit having inlet and outlet restrictions therein, said pressure actuated member communicating with said last-named fluid circuit at a point between said two restrictions, means to vary the restrictive effect of at least one of said restrictions to control the balancing pressure acting in said circuit on said pressure actuated member for establishing the balanced position of said valve means and thereby the position of said movable controlled member, whereby the combined movements of said force-producing means and said valve means and said pressure actuated member in responding to changes in said controlled condition are substantially frictionless.

12. In a governor for a rotating machine having a control member to regulate the speed of rotation thereof, the combination of means to effect movement of said control member comprising, a first pressure responsive member operatively connected to said control member for actuation thereof, rotary centrifugal pump means driven by said rotating machine for revolving a mass of liquid to produce a liquid pressure which is a function of the speed thereof, a substantially frictionless second pressure responsive member communicating with the liquid pressure produced by said centrifugal pump means to produce forces varying as a function of the speed thereof, a pressure fluid circuit communicating with said first pressure responsive member, valve means in said fluid circuit to direct pressure fluid to said first pressure responsive member for effecting speed controlling movements thereof, said valve means including means for connection of said valve means and said second pressure responsive member, and substantially frictionless swingable means imparting rigidity in one direction to constrain said valve means for substantially frictionless movements in a direction substantially transverse to said first direction and for frictionless suspension within the fluid controlled thereby with only fluid contact at the flow controlling surfaces thereof during operational movements, and substantially frictionless biasing means acting on said valve means in opposition to the force produced by said second pressure responsive member as a result of said liquid pressure acting thereon, whereby the combined speed-responsive movements of said second pressure responsive member and said valve means and said biasing means are substantially frictionless and thereby capable of responding to minute changes in the liquid pressure produced by said centrifugal pump means to effect movement of said first pressure responsive member and said control member to maintain the speed of rotation of the rotating machine, and means to vary the forces acting on said valve means as a function of the movement of said control member.

13. In a governor for a rotating machine having a control member to regulate the speed of rotation thereof, the combination of means to effect movement of said control member comprising, a first pressure responsive member operatively connected to said control member for actuation thereof, rotary centrifugal pump means driven by said rotating machine for revolving a mass of liquid to produce a liquid pressure which is a function of the speed thereof, a substantially frictionless second pressure responsive member communicating with the liquid pressure produced by said centrifugal pump means to produce forces varying as a function of the speed thereof, a pressure fluid circuit communicating with said first pressure responsive member, valve means in said fluid circuit to direct pressure fluid to said first pressure responsive member for effecting speed controlling movements thereof, said valve means including means for connection of said valve means and said second pressure responsive member, and substantially frictionless swingable means imparting rigidity in one direction to constrain said valve means for substantially frictionless movements in a direction substantially transverse to said first direction and for frictionless suspension within the fluid controlled thereby with only fluid contact at the flow controlling surfaces thereof during operational movements, and substantially frictionless biasing means acting on said valve means in opposition to the force produced by said second pressure responsive member as a result of said liquid pressure acting thereon, whereby the combined speed-responsive movements of said second pressure responsive member and said valve means and said biasing means are substantially frictionless and thereby capable of responding to minute changes in the liquid pressure produced by said centrifugal pump means to effect movement of said first pressure responsive member and said control member to maintain the speed of rotation of the rotating machine, and means actuated by movements of said control member and cooperable first pressure responsive member to vary the pressure produced by said centrifugal pump means as a function of the movement of said control member.

14. In a governor for automatically controlling the speed of an engine having a control member to regulate the speed thereof throughout a predetermined range of engine load, the combination of means to actuate said control member comprising, a pressure responsive member connected to said control member for actuation thereof, a centrifugal liquid device including rotary means driven by the engine for revolving a mass of liquid to produce liquid pressures varying as a function of engine speed, said device including a substantially frictionless member sensitive to said liquid pressure for movements in response to changes in speed to tranmsit forces produced by said liquid pressure, a fluid circuit communicating with said pressure responsive member, and a substantially frictionless sensing mechanism comprising said liquid-pressure-sensitive member, and valve means in said circuit connected to said liquid-pressure-sensitive member to direct fluid to said pressure responsive member for effecting speed controlling movements thereof, leaf spring means connected to said valve means to support same for substantially frictionless movements and to prevent sliding-surface-contact during operative movements thereof, substantially frictionless biasing means producing a force acting on said valve means in opposition to said forces produced by said liquid pressure and varying as a function of engine speed, and means actuated with said control member to control the forces acting on said valve means as a function of the movement of said control member for regulating the amount the speed for a given governor setting varies as the said engine load varies from full-load to no-load.

15. The combination of elements defined in claim 1, and said means to vary the aperture of at least one of said orifices comprises a manually controlled valve to select the pressure in said chamber for establishing the speed at which said device operates.

16. The combination of elements defined in claim 1, and said means to vary the aperture of at least one of said orifices includes pressure regulating means for maintaining any desired pressure in said chamber between said two orifices acting on said pressure actuated member to control the speed at which said device operates.

17. The combination of elements defined in claim 1, and said means to vary the aperture of at least one of said orifices includes pressure regulating means for maintaining any desired pressure in said chamber between said two orifices acting on said pressure actuated member, and said regulating means including manually adjustable means to select any desired regulated pressure and hence a corresponding operating speed at which said device operates.

18. The combination of elements defined in claim 11, and said means to vary the restrictive effect of at least one of said restrictions includes pressure regulating means for maintaining a desired pressure in said circuit between said two restrictions irrespective of any pressure variations elsewhere in said last-named circuit.

19. The combination of elements defined in claim 4, and a fluid circuit in one of said governors communcating with said source of fluid pressure and having a pair of restrictions therein, said second pressure responsive member communicating with said last-named circuit at a point between said two restrictions, and valve means to vary the restrictive effect of at least one of said restrictions to control the pressure acting on said second pressure responsive member for controlling the speed of all of said plurality of rotating machines.

20. The combination of elements defined in claim 4, and a fluid circuit in one of said governors communicating with said source of fluid pressure and having a pair of restrictions therein, said second pressure responsive member communicating with said last-named circuit at a point between said two restrictions, pressure regulating means to vary the restrictive effect of at least one of said restrictions for maintaining any desired pressure in said chamber between said two restrictions acting on said second pressure responsive member, and said regulating means including adjustable means to select said desired regulated pressure for controlling the speed of all of said plurality of rotating machines.

References Cited in the file of this patent

UNITED STATES PATENTS

| Number | Name | Date |
|---|---|---|
| 220,202 | Wilder | Sept. 30, 1879 |
| 1,281,316 | Elliott | Oct. 15, 1918 |
| 1,388,859 | Hentschke | Aug. 30, 1921 |
| 1,887,322 | Nettleton | Nov. 8, 1932 |
| 1,987,505 | Edler | Jan. 8, 1935 |
| 2,020,847 | Mitereff | Nov. 12, 1935 |
| 2,047,101 | Grove | July 7, 1936 |
| 2,054,464 | Johnson | Sept. 15, 1936 |
| 2,212,709 | Grove | Aug. 27, 1940 |
| 2,261,364 | Grove | Nov. 4, 1941 |
| 2,298,112 | Edwards | Oct. 6, 1942 |
| 2,370,137 | Biggert | Feb. 27, 1945 |
| 2,384,282 | Chandler | Sept. 4, 1945 |
| 2,410,774 | Chandler | Nov. 5, 1946 |
| 2,424,901 | Richolt | July 29, 1947 |
| 2,438,663 | Greenland | Mar. 30, 1948 |
| 2,442,954 | Lee | June 8, 1948 |
| 2,464,636 | Eaton | Mar. 15, 1949 |
| 2,484,553 | Carson | Oct. 11, 1949 |
| 2,484,557 | Eckman | Oct. 11, 1949 |
| 2,500,407 | Segerstad | Mar. 14, 1950 |
| 2,598,180 | Kenyon | May 27, 1952 |
| 2,598,891 | Cooke | June 3, 1952 |
| 2,653,020 | Stinson | Sept. 22, 1953 |
| 2,736,304 | Thorner | Feb. 28, 1956 |
| 2,737,165 | Thorner | Mar. 6, 1956 |

FOREIGN PATENTS

| Number | Country | Date |
|---|---|---|
| 39,943 | France | Dec. 28, 1931 |
| 423,676 | Germany | Jan. 8, 1926 |